Feb. 2, 1932.  A. N. TEBIEFF ET AL  1,843,848
CHILD'S VEHICLE
Filed May 17, 1930
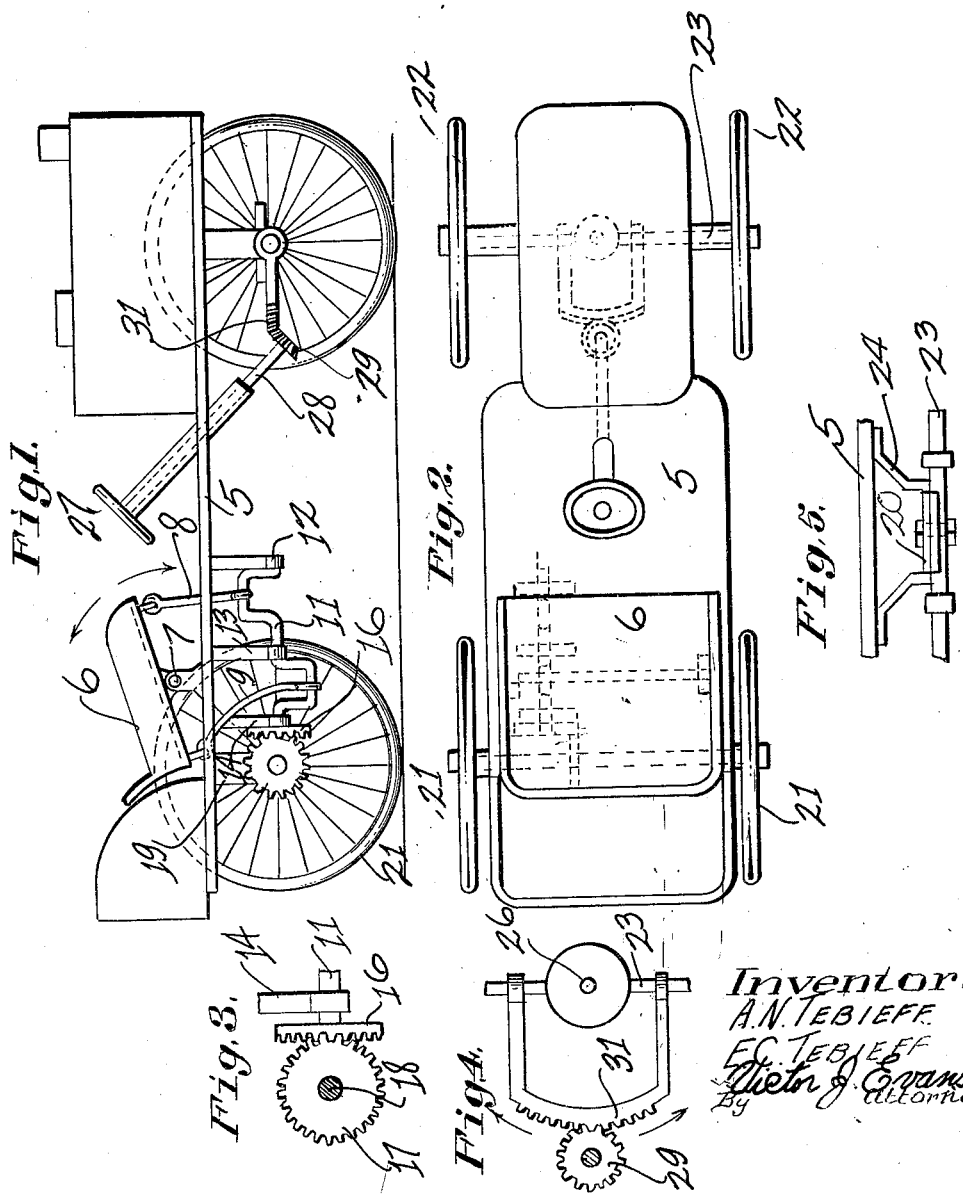

Patented Feb. 2, 1932

1,843,848

UNITED STATES PATENT OFFICE

ALEXANDER N. TEBIEFF AND ELIA C. TEBIEFF, OF LOS ANGELES, CALIFORNIA

CHILD'S VEHICLE

Application filed May 17, 1930. Serial No. 453,315.

This invention relates to improvements in vehicles and has particular reference to a child's vehicle.

The principal object of this invention is to produce a vehicle which will give the user considerable exercise through the operation of the vehicle.

A further object is to produce a vehicle which will be economical to manufacture.

A still further object is to produce a vehicle simulating a motor vehicle.

Other objects and advantages will be apparent during the course of the following description.

In the accompanying drawings forming a part of this specification and in which like numerals are employed to designate like parts throughout the same, Figure 1 is a side elevation of our vehicle, Figure 2 is a top plan view of Figure 1, Figure 3 is an enlarged cross sectional view of the driving gear.

Figure 4 is an enlarged detail view of the steering mechanism, and

Figure 5, is a fragmentary detail view of the king bolt.

Children enjoy any form of vehicle which enables them to ride, and particularly a vehicle which in some manner simulates a motor vehicle. Applicants have therefore produced a vehicle wherein the rocking motion of the seat serves to propel the vehicle over the ground and they have further provided a steering wheel so that the vehicle may be steered from the seat through use of the hands upon the wheel.

In the accompanying drawings wherein for the purpose of illustration is shown a preferred embodiment of my invention, the numeral 5 designates the base of the vehicle upon which a seat 6 is pivoted as at 7. This seat is connected by links 8 and 9 to a crank 11 pivotally supported as at 12, 13 and 14 beneath the base of the vehicle. This crank carries a gear 16 which meshes with a gear 17 secured upon the shaft 18 supported in bearings 19 and having wheels 21 upon its ends thus through the rocking movement of the seat 6, motion is transmitted to the wheels 21 and therefore the vehicle is propelled either forwardly or backwardly depending upon the direction of rotation of the crank 11. In order to steer the vehicle the front wheels 22 are mounted upon the axle 23 which is in turn suspended from the body 5 by a yoke 24 and king bolt 26.

The hand wheel 27 rotates a shaft 28 having a gear 29 which meshes with a segment 31 attached to the axle 23. Thus by rotating the handle 27 these front wheels 22 are moved about the king bolt 26 and the vehicle will proceed in the direction the wheels are manipulated.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:—

In a child's vehicle simulating a motor car, a base, a seat portion pivotally mounted on said base, the pivotal point being centrally positioned under said seat, said seat adapted to rock in a direction corresponding to the direction of movement of the vehicle, a crank positioned beneath said vehicle and having front and rear bends therein, a curved link member connecting the rear portion of said seat and the rear bend of said crank, a second link member connecting the front portion of said seat and front bend of said crank whereby when said seat is actuated on its pivot said crank will be rotated, and gearing connecting said crank and the rear wheels of said vehicle.

In testimony whereof we affix our signatures.

ALEXANDER N. TEBIEFF.
ELIA C. TEBIEFF.